(12) United States Patent
Parikh et al.

(10) Patent No.: US 10,999,281 B2
(45) Date of Patent: May 4, 2021

(54) SYNCHRONIZING ACCESS CONTROLS BETWEEN COMPUTING DEVICES

(71) Applicant: Google LLC, Mountain View, CA (US)

(72) Inventors: Stavan Parikh, San Jose, CA (US); Wei Lu, San Jose, CA (US); Tarun Jain, Los Altos, CA (US); Anshul Gupta, San Francisco, CA (US); Srishti Srivastava, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/345,009

(22) PCT Filed: Feb. 19, 2019

(86) PCT No.: PCT/US2019/017806
§ 371 (c)(1),
(2) Date: Apr. 25, 2019

(87) PCT Pub. No.: WO2019/216969
PCT Pub. Date: Nov. 14, 2019

(65) Prior Publication Data
US 2021/0051148 A1    Feb. 18, 2021

Related U.S. Application Data

(60) Provisional application No. 62/668,218, filed on May 7, 2018.

(51) Int. Cl.
*H04L 29/06* (2006.01)
*G06F 40/205* (2020.01)
*H04L 29/08* (2006.01)

(52) U.S. Cl.
CPC ............ *H04L 63/10* (2013.01); *G06F 40/205* (2020.01); *H04L 67/141* (2013.01)

(58) Field of Classification Search
CPC ...... H04L 63/10; H04L 67/141; G06F 40/205
See application file for complete search history.

(56) References Cited

U.S. PATENT DOCUMENTS

2017/0064550 A1   3/2017   Sundaresan et al.
2017/0257456 A1   9/2017   Vaish et al.

OTHER PUBLICATIONS

International Search Report and Written Opinion on PCT/US2019/0017806, dated May 27, 2019 (74 pages).
International Preliminary Report on Patentability for PCT Appln. Ser. No. PCT/US2019/017806 dated Nov. 19, 2020 (12 pages).

*Primary Examiner* — Kristie D Shingles
(74) *Attorney, Agent, or Firm* — Foley & Lardner LLP

(57) ABSTRACT

Synchronization of access controls between computing devices is provided. The system receives a request from a first device. The system performs a session handover to a second device responsive to determining an incompatibility. The system modifies a parameter in an access control database. The system receives a request from a third device. The system provides the digital component to the third device.

20 Claims, 4 Drawing Sheets

SYNCHRONIZING ACCESS CONTROLS BETWEEN COMPUTING DEVICES

CROSS-REFERENCES TO RELATED APPLICATIONS

This application is a U.S. National Stage under 35 U.S.C. § 371 of International Patent Application No. PCT/US19/17806, filed on Feb. 13, 2019 and designating the United States, which claims the benefit of priority under 35 U.S.C. § 119 to U.S. Provisional Patent Application No. 62/668,218, filed May 7, 2018, each of which is hereby incorporated by reference herein in its entirety.

BACKGROUND

Different computing devices may have different capabilities, such as different input or output interfaces or computational performance capabilities.

SUMMARY

The present disclosure is generally directed to synchronizing access controls between computing devices. Due to the limited input or output interfaces, or other processing capabilities available on different devices, it can be challenging or not possible to access certain types of digital components or modify access control parameters of such digital components from certain types of devices. Systems and methods of the present technical solution allow a session to access or modify a digital component from a first device, and then handover the session to a second device to complete the access or modification. The access control parameters can be modified in a digital access control database that can be used by multiple devices in order to access the digital component.

At least one aspect is directed to a system to synchronize access controls between computing devices. The system can include a data processing system having one or more processors. The data processing system can execute an interactive data exchange component, a compatibility checker component, a session transfer component, and an access controller component. The interactive data exchange component can receive, via an interface of the data processing system, data packets comprising an input audio signal detected by a sensor of a first client device linked with an account identifier. The interactive data exchange component can parse, based on a natural language processing technique, the data packets comprising the input audio signal to identify a request for a digital component and one or more keywords corresponding to the request. The interactive data exchange component can establish a session with the first client device. The interactive data exchange component can generate, based on a policy for the digital component stored in a digital access control database, an input prompt with a field responsive to the request for the digital component by the first client device linked with the account identifier. The compatibility checker component can determine that the input prompt is incompatible with the first client device. The session transfer component can identify, responsive to the determination that the input prompt is incompatible with the first client device, a status of a second client device linked with the account identifier that is linked with the first client device. The compatibility checker can determine that the input prompt is compatible with the second client device based on the status identified by the session transfer component. The session transfer component can handover the session to the second client device and terminate a portion of the session with the first client device. The interactive data exchange component can transmit, responsive to the handover, the input prompt to the second client device. The interactive data exchange component can receive data packets input via the second client device responsive to the input prompt. The access controller component can modify, based on the data packets input via the second client device, a parameter for the digital component stored in the digital access control database for the account identifier. The interactive data exchange component can receive a request to execute the digital component on a third client device linked with the account identifier. The data processing system can provide, responsive to validation by the access controller component of the parameter for the digital component stored in the digital access control database for the account identifier and a determination by the compatibility checker component that the digital component is compatible with the third client device, the digital component for execution by the third client device.

At least one aspect is directed to a method of synchronizing access controls between computing devices. The method can be performed by a data processing system having one or more processors and memory. The method can include the data processing system receiving data packets comprising an input audio signal detected by a sensor of a first client device linked with an account identifier. The method can include the data processing system parsing, based on a natural language processing technique, the data packets having the input audio signal to identify a request for a digital component and one or more keywords corresponding to the request. The method can include the data processing system establishing a session with the first client device. The method can include the data processing system generating, based on a policy for the digital component stored in a digital access control database, an input prompt with a field responsive to the request for the digital component by the first client device linked with the account identifier. The method can include the data processing system determining, by the data processing system, that the input prompt is incompatible with the first client device. The method can include the data processing system identifying, responsive to the determination that the input prompt is incompatible with the first client device, a status of a second client device linked with the account identifier that is linked with the first client device. The method can include the data processing system determining that the input prompt is compatible with the second client device based on the status identified by the session transfer component. The method can include the data processing system performing a handover of the session to the second client device and terminate a portion of the session with the first client device. The method can include the data processing system transmitting, responsive to the handover, the input prompt to the second client device. The method can include the data processing system receiving data packets input via the second client device responsive to the input prompt. The method can include the data processing system modifying, based on the data packets input via the second client device, a parameter for the digital component stored in the digital access control database for the account identifier. The method can include the data processing system receiving a request to execute the digital component on a third client device linked with the account identifier. The method can include the data processing system providing, responsive to validation by the access controller component of the parameter for the digital component stored in the digital access control database for the account identifier and a determination by the compatibility checker component that the digital component is compatible with the third client device, the digital component for execution by the third client device.

Each aspect can optionally include one or more of the following features. Identifying a plurality of client devices linked with the account identifier; identifying a subset of the plurality of client devices that are compatible with the digital component; and providing, responsive to modification of the parameter, the digital component for execution on the subset of the plurality of client devices. Converting a format of the digital component based on the status of the third client device. Receiving a request from the third client device to execute a second digital component; determining, based on a parameter stored for the second digital component in the access control database, that the third client device is unauthorized to execute the second digital component; transmitting, to the second client device, an input prompt for the second digital component; and authorizing the third client device responsive to input provided via the second client device. Storing one or more rules in the access control database for the digital component. Modifying the parameter to provide authorization to execute the digital component by the third client device. Determining a type of the parameter based on a type of the digital component; and modifying the parameter based on the type. Identifying a plurality of fields in the input prompt; generating audio queries for each of the plurality of fields; and receiving one or more input audio signals responsive to the audio queries generated for each of the plurality of fields. The session may comprise an access control session. the access control session may be initiated responsive to the input audio signal detected via the first client device; pausing the access control session on the first client device; handing over the access control session from the first client device to the second client device; and terminating the access control session responsive to the data packets input via the second client device responsive to the input prompt. The digital component may be provided by a third-party computing device. The data processing system may instruct a third-party computing device to provide the digital component for execution by the third client device. The first client device may execute a first surface or user interface type, the second client device may execute a second surface or user interface type, and the third client device may execute a third surface or user interface type different from the first surface and the second surface. The data processing system may be configured to provide the digital component for execution by the third surface and the second surface. Providing, for storage in memory of the third client device, the parameter for the digital component on the digital access control database for the account identifier; updating, responsive to the data packets input via the second client device responsive to the input prompt, the parameter for the digital component stored in the memory of the third client device. Identifying devices within a predetermined distance of the first digital assistant device; and wherein the second device is selected based upon the identified devices within a predetermined distance of the first digital assistant device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
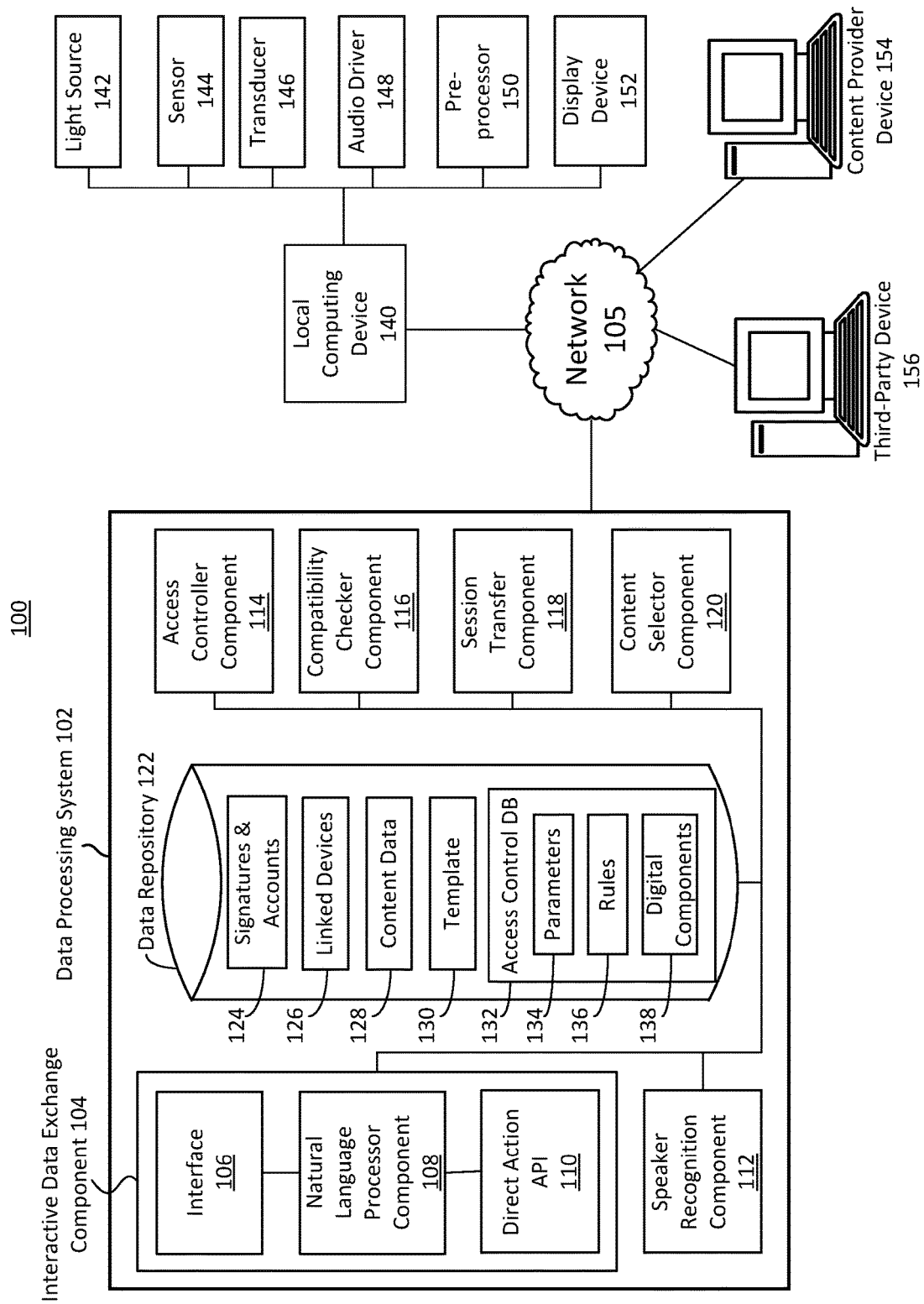
FIG. 1 is an illustration of an example system to synchronize access controls between computing devices.

Following below are more detailed descriptions of various concepts related to, and implementations of, methods, apparatuses, and systems of routing packetized actions via a computer network. The various concepts introduced above and discussed in greater detail below may be implemented in any of numerous ways.

The present disclosure is generally directed to synchronizing access controls between computing devices. Due to the limited input or output interfaces, or other processing capabilities available on different devices, it can be challenging or not possible to access certain types of digital components or modify access control parameters of such digital components from certain types of devices. Systems and methods of the present technical solution allow a session to access or modify a digital component from a first device, and then handover the session to a second device to complete the access or modification. The access control parameters can be modified in a digital access control database that can be used by multiple devices in order to access the digital component.

By providing a data processing system that can automatically determine that a first digital assistant device lacks or is not optimally configured to process certain types of commands or instructions, and then handover a session to a second digital assistant device, the data processing system provides a guided interaction process that utilizes properties of the first and second digital assistant devices. The data processing system can reduce unnecessary processing by the first digital assistant device while providing the additional technical functionality of adjusting or modifying an access control by seamlessly transferring a session to a second digital assistant. Furthermore, the data processing system can maintain an access control database that can include the parameters or rules for the digital component. The access control database can be a centrally located access control database. By maintaining or managing the access control database, the data processing system can facilitate providing the digital component to devices authorized to execute the digital component. The present solution can reduce resource consumption, processor utilization, battery consumption, bandwidth utilization, size of an audio file, or amount of time consumed by a first digital assistant device that may not include the input or output ports, interfaces or components to authorize or authenticate a command to modify an access control for a digital component.

For example, a digital component can be requested via a digital assistant human interface (referred to herein as a surface), such as a conversational application programming interface. This can include requesting in-application items, subscription or paid applications, and can be provided by third-party developers in their application that can use a digital assistant component or surface. When a digital component is accessed (e.g., an audiobook, digital currency, electronic file, or digital music), the data processing system can provide this digital component for use across some or all digital assistant surfaces or applications linked to the account. For example, an audio book can be requested on a first digital assistant device that can be a speaker, and then later executed on a smartphone.

The data processing system can record the request or access control parameter of the digital component in a central database which captures access control parameters adjusted by a user across different digital assistant surfaces. When a particular digital assistant surface or application is used, then the digital assistant surface can make a request to the central database for the digital component access control parameter for the account. There can be a device handover (e.g., transfer the session to a smartphone to confirm the electronic transaction) in case the access control adjustment cannot be completed on a particular device. For example, if authentication is required but not provided in a first digital assistant device, then the data processing system can transfer the session to a second digital assistant device such as a smartphone for authentication. After the authentication is completed, the digital component can be utilized by devices linked with the account and compatible with the digital component. Thus, systems and methods of the present technical solution can allow a digital component to be obtained via a voice interface across any digital assistant device, surface or application, and then provide the digital component for execution on any digital assistant device, surface or application configured to execute the digital component.

FIG. 1 illustrates an example system 100 to synchronize access controls between computing devices. The system 100 can include content selection infrastructure. The system 100 can include a data processing system 102. The data processing system 102 can communicate with one or more of a content provider computing device 154, third-party device 156, or local computing device 140 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one local computing device 140, such as a laptop, desktop, tablet, digital assistant device, smart phone, portable computers, or speaker. For example, via the network 105 a user of the local computing device 140 can access information or data provided by a content provider 154. The computing device 140 may or may not include a display; for example, the computing device may include limited types of user interfaces, such as a microphone and speaker. In some cases, the primary user interface of the computing device 140 may be a microphone and speaker, or voice interface.

The local computing device 140 can refer to a computing device or client device that is located at a public setting, such as a hotel, office, restaurant, retail store, mall, park, or a private setting, such as a residential dwelling. The term local can refer to the computing device being located where a user can interact with the computing device using voice input or other input. The local computing device can be located remote from a remote server, such as a data processing system 102. Thus, the local computing device 140 can be positioned in a hotel room, mall, cubicle, or other building or abode at which a user can interact with the local computing device 140 using voice input, whereas the data processing system 102 can be located remotely in a data center, for example. The local computing device 140 can be referred to as a digital assistant device.

The network 105 can include or constitute a display network, e.g., a subset of information resources available on the internet that are associated with a content placement or search engine results system, or that are eligible to include third party digital components as part of a digital component placement campaign. The network 105 can be used by the data processing system 102 to access information resources such as web pages, web sites, domain names, or uniform resource locators that can be presented, output, rendered, or displayed by the local client computing device 140. For example, via the network 105 a user of the local client computing device 140 can access information or data provided by the content provider computing device 154 or the service provider computing device 108.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example with the computing device 140, the content provider computing device 154 (content provider 154), or the third-party device 156 (or third-party 156). The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one third-party device 156. The third-party device 156 can include at least one logic device such as a computing device having a processor to communicate via the network 105, for example with the computing device 140, the data processing system 102, or the content provider 154. The third-party device 156 can include at least one computation resource, server, processor or memory. For example, third-party device 156 can include a plurality of computation resources or servers located in at least one data center.

The content provider device 154 can provide audio based digital components for display by the local computing device 140 as an audio output digital component. The digital component can include an offer for a good or service, such as a voice based message that states: "Would you like me to order you a taxi?" For example, the content provider computing device 154 can include memory to store a series of audio digital components that can be provided in response to a voice based query. The content provider computing device 154 can also provide audio based digital components (or other digital components) to the data processing system 102 where they can be stored in the data repository 122. The data processing system 102 can select the audio digital components and provide (or instruct the content provider computing device 154 to provide) the audio digital components to the local client computing device 140. The audio based digital components can be exclusively audio or can be combined with text, image, or video data.

The third-party device 156 can include, interface with, or otherwise communicate with the data processing system 102. The third-party device 156 can include, interface, or otherwise communicate with the local computing device 140. The third-party device 156 can include, interface, or otherwise communicate with the computing device 140, which can be a mobile computing device. The third-party device 156 can include, interface, or otherwise communicate with the content provider device 154. For example, the third-party device 156 can provide a digital component to the local computing device 140 for execution by the local computing device 140. The third-party device 156 can provide the digital component to the data processing system 102 for storage by the data processing system 102. The third-party device 156 can provide rules or parameters relating to the digital component to the data processing system 102 for storage in an access control database 132.

The local computing device 140 can include, interface, or otherwise communicate with at least one sensor 144, transducer 146, audio driver 148, or pre-processor 150. The local computing device 140 can include a light source 142 or display device 152, such as a light indicator, light emitting diode ("LED"), organic light emitting diode ("OLED"), or other visual indicator configured to provide a visual or optic output. The sensor 144 can include, for example, an ambient light sensor, proximity sensor, temperature sensor, accelerometer, gyroscope, motion detector, GPS sensor, location sensor, microphone, or touch sensor. The transducer 146 can include a speaker or a microphone. The audio driver 148 can provide a software interface to the hardware transducer 146. The audio driver can execute the audio file or other instructions provided by the data processing system 102 to control the transducer 146 to generate a corresponding acoustic wave or sound wave. The pre-processor 150 can include a processing unit having hardware configured to detect a keyword and perform an action based on the keyword. The pre-processor 150 can filter out one or more terms or modify the terms prior to transmitting the terms to the data processing system 102 for further processing. The pre-processor 150 can convert the analog audio signals detected by the microphone into a digital audio signal, and transmit one or more data packets carrying the digital audio signal to the data processing system 102 via the network 105. In some cases, the pre-processor 150 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The local client computing device 140 can be associated with an end user that enters voice queries as audio input into the local client computing device 140 (via the sensor 144) and receives audio output in the form of a computer generated voice that can be provided from the data processing system 102 (or the content provider computing device 154 or the service provider computing device 108) to the local client computing device 140, output from the transducer 146 (e.g., a speaker). The computer generated voice can include recordings from a real person or computer generated language.

The data repository 122 can include one or more local or distributed databases, and can include a database management system. The data repository 122 can include computer data storage or memory and can store one or more signatures and account information 124, linked device information 126, content data 128, template data 130, and an access control database 132, among other data. The access control database 132 can include or store parameters 134, rules 136, and digital components 138 (or identifiers or reference identifiers to digital components 138). The signatures and account information 124 can include acoustic signatures or voice signatures that can be used by the speaker recognition component 112 to identify an account corresponding to a user of the local computing device 140. Signatures 124 can include acoustic or audio signatures. The signatures 124 can refer to an acoustic fingerprint, which can include a condensed digital summary, a fingerprint, deterministically generated from an audio signal, that can be used to identify an audio sample or quickly locate similar items in an audio database. The signatures 124 can include data to facilitate identifying a profile by the speaker recognition component 112.

The account information can include or refer to profile information, preferences, electronic account information, or an account corresponding to access control database 132. The linked device information 126 can include or refer to device identifiers that are associated with the account 124

(e.g., local computing device 140, first digital assistant device 280, second digital assistant device 282, or third digital assistant device 284). The linked device information 126 can include devices that have been provisioned by the data processing system 102 for use with the account. Linked device information 126 can include or refer to devices that are authorized or authenticated to access digital components 138 in accordance with the access control database 132. The content data 128 can include digital components for audio output or associated metadata, as well as input audio messages that can be part of one or more communication sessions with the local client computing device 140. Content data 128 can include, for example, content campaign information, content groups, content selection criteria, digital component objects or other information provided by a content provider 154 or obtained or determined by the data processing system to facilitate content selection. The content data 128 can include, for example, historical performance of a content campaign.

Template data 130 can include or refer to a template used to generate an input prompt or other prompt, notification or alert. The template 130 can store different templates configured for different types of local computing devices 140, for example based on the available user interfaces, input interfaces or output interface available on the local computing device 140. The template 130 can be established by a third-party device 156 and provided to the data processing system 102 for storage and utilization, or the template 130 can be created by an administrator of the data processing system 102 or generated based on rules or policies.

The access control database ("DB") 132 can include information about digital components 138. Digital components 138 can refer to or include electronic data or data files that can be executed by a local computing device 140 or linked device (e.g., third digital assistant device 284). The digital component 138 can refer to or include audiobooks, digital music file, digital movie file, multimedia files, electronic games, programs, scripts, application program interfaces, or digital currency. The digital components 138 can be stored in the access control database 132, or references or identifiers of the digital components 138 can be stored in the access control database 132. For example, the digital component 138 (or data file thereof) can be stored at the third-party device 156 (e.g., the provider or developer of the digital component 138), and the access control database 132 can store a deep link, uniform resource locator, or other reference identifier to the digital component 138. The access control database 132 can store parameters 134. Parameters 134 can refer to a type of access or access control for the digital component 138. Parameters 134 can include, for example, thresholds, distances, time intervals, durations, scores, or weights. The parameter can include a value. The value can be numeric, binary, alphanumeric, or symbolic. For example, a parameter can indicate whether the digital component 138 is accessible to the local computing device 140 associated with the account, or inaccessible to the local computing device 140. The parameter 134 can be [Authorized] and the value can be [Yes] or [No]. The parameter 134 can be [subscription_type] and the value can be [one_time_use], [number_of_uses], [unlimited_use], or [time_interval], where the time interval can be weekly, monthly, or yearly. Other parameters 134 can be established by the third-party device 156 or developer or provider of the digital component 138. The rules 136 can refer to or include policies or characteristics for the digital component that can be used to establish the parameters 134 for the digital component 138. For example, a rule can be: If digital component type is audiobook, then parameter values can be [one_time_use], [number_of_uses], [unlimited_use], or [time_interval]. A rule can be: If digital component is digital currency, then parameter values can be [exchangeable]. A rule can be: If digital component is streaming multimedia file, then parameter is [downloading_prohibited] or [monthly subscription]. Thus, by allowing the access control database 132 to be configured with different rules 136 and parameters 134 for different digital component 138, the access control database 132 can maintain or manage different types of digital component and their access control in a central data processing system 102. The data processing system can store one or more rules in the access control database for the digital component.

The data processing system 102 can include a content placement system having at least one computation resource or server. The data processing system 102 can include, interface, or otherwise communicate with at least one interface 106. The data processing system 102 can include, interface, or otherwise communicate with at least one natural language processor component 108. The data processing system 102 can include, interface, or otherwise communicate with at least one direct action application programming interface ("API") 110. The interface 106, natural language process component 108 and direct action API 110 can form an interactive data exchange component 104. The data processing system 102 can include, interface, or otherwise communicate with at least one interactive data exchange component 104. The interactive data exchange component 104 can include or refer to a conversational API or digital assistant functionality. The interactive data exchange component 104 can communicate or interface with one or more voice-based interfaces or various digital assistant devices or surfaces in order to provide data or receive data or perform other functionality.

The data processing system 102 can include, interface, or otherwise communicate with at least one content selector component 120. The data processing system 102 can include, interface, or otherwise communicate with at least one speaker recognition component 112. The data processing system 102 can include, interface, or otherwise communicate with at least one data repository 122. The data processing system 102 can include, interface, or otherwise communicate with at least one access controller component 114. The data processing system 102 can include, interface, or otherwise communicate with at least one compatibility checker component 116. The data processing system 102 can include, interface, or otherwise communicate with at least one session transfer component 118.

The interactive data exchange component 104, interface 106, natural language processor component 108, direct action API 110, speaker recognition component 112, access controller component 114, compatibility checker component 116, session transfer component 118, or content selector component 120, can each include at least one processing unit or other logic device such as programmable logic array engine, or module configured to communicate with the database repository 122 or database. The interactive data exchange component 104, interface 106, natural language processor component 108, direct action API 110, speaker recognition component 112, access controller component 114, compatibility checker component 116, session transfer component 118, or content selector component 120 and data repository 122 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of local computing devices 140 (or computing device or digital assistant device). A user of a local computing device 140 or mobile computing device can affirmatively authorize the data processing system 102 to obtain network activity information corresponding to the local computing device 140 or mobile computing device. For example, the data processing system 102 can prompt the user of the computing device 140 for consent to obtain one or more types of network activity information. The local computing device 140 can include a mobile computing device, such as a smartphone, tablet, smartwatch, or wearable device. The identity of the user of the local computing device 140 can remain anonymous and the computing device 140 can be associated with a unique identifier (e.g., a unique identifier for the user or the computing device provided by the data processing system or a user of the computing device). The data processing system can associate each observation with a corresponding unique identifier.

A content provider 154 can establish an electronic content campaign. The electronic content campaign can be stored as content data 128 in data repository 122. An electronic content campaign can refer to one or more content groups that correspond to a common theme. A content campaign can include a hierarchical data structure that includes content groups, digital component data objects, and content selection criteria. To create a content campaign, content provider 154 can specify values for campaign level parameters of the content campaign. The campaign level parameters can include, for example, a campaign name, a preferred content network for placing digital component objects, a value of resources to be used for the content campaign, start and end dates for the content campaign, a duration for the content campaign, a schedule for digital component object placements, language, geographical locations, type of computing devices on which to provide digital component objects. In some cases, an impression can refer to when a digital component object is fetched from its source (e.g., data processing system 102 or content provider 154), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the digital component object for display on the computing device 140. In some cases, an impression can refer to a viewable or audible impression; e.g., the digital component object is at least partially (e.g., 20%, 30%, 30%, 40%, 50%, 60%, 70%, or more) viewable on a display device 152 of the local client computing device 140, or audible via a speaker 136 of the computing device 140. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The content provider 154 can further establish one or more content groups for a content campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the digital component in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider 154 can use to capture a topic or subject matter for which digital component objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider 154 can provide one or more keywords and digital component objects to each content group. Keywords can include terms that are relevant to the product or services of associated with or identified by the digital component objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select digital component objects.

The content provider 154 can provide one or more keywords to be used by the data processing system 102 to select a digital component object provided by the content provider 154. The content provider 154 can identify one or more keywords to bid on, and further provide bid amounts for various keywords. The content provider 154 can provide additional content selection criteria to be used by the data processing system 102 to select digital component objects. Multiple content providers 154 can bid on the same or different keywords, and the data processing system 102 can run a content selection process or ad auction responsive to receiving an indication of a keyword of an electronic message.

The content provider 154 can provide one or more digital component objects for selection by the data processing system 102. The data processing system 102 (e.g., via content selector component 120) can select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, a text digital component, an image digital component, video digital component, multimedia digital component, or digital component link. A digital component object (or digital component) can include, for example, a content item, an online document, audio, images, video, multimedia content, or sponsored content. Upon selecting a digital component, the data processing system 102 can transmit the digital component object for rendering on a computing device 140 or display device 152 of the computing device 140. Rendering can include displaying the digital component on a display device, or playing the digital component via a speaker of the computing device 140. The data processing system 102 can provide instructions to a computing device 140 to render the digital component object. The data processing system 102 can instruct the computing device 140, or an audio driver 148 of the computing device 140, to generate audio signals or acoustic waves.

The data processing system 102 can include an interface 106 (or interface component) designed, configured, constructed, or operational to receive and transmit information using, for example, data packets. The interface 106 can receive and transmit information using one or more protocols, such as a network protocol. The interface 106 can include a hardware interface, software interface, wired interface, or wireless interface. The interface 106 can facilitate translating or formatting data from one format to another format. For example, the interface 106 can include an application programming interface that includes definitions for communicating between various components, such as software components. The interface 106 can communicate with one or more of the local computing device 140, content provider device 154, or third-party device 156 via network 105.

The data processing system 102 can interface with an application, script or program installed at the local client computing device 140, such as an app to communicate input audio signals to the interface 106 of the data processing system 102 and to drive components of the local client computing device to render output audio signals. The data processing system 102 can receive data packets or other signal that includes or identifies an audio input signal.

The data processing system 102, or interactive data exchange component 104 can include a natural language processor ("NLP") component 108. For example, the data processing system 102 can execute or run the NLP component 108 to receive or obtain the audio signal and parse the audio signal. For example, the NLP component 108 can provide for interactions between a human and a computer. The NLP component 108 can be configured with techniques for understanding natural language and allowing the data processing system 102 to derive meaning from human or natural language input. The NLP component 108 can include or be configured with technique based on machine learning, such as statistical machine learning. The NLP component 108 can utilize decision trees, statistical models, or probabilistic models to parse the input audio signal. The NLP component 108 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 108 can convert the audio input signal into recognized text by comparing the input signal against a stored, representative set of audio waveforms (e.g., in the data repository 122) and choosing the closest matches. The set of audio waveforms can be stored in data repository 122 or other database accessible to the data processing system 102. The representative waveforms are generated across a large set of users, and then may be augmented with speech samples from the user. After the audio signal is converted into recognized text, the NLP component 108 matches the text to words that are associated, for example via training across users or through manual specification, with actions that the data processing system 102 can serve. Aspects or functionality of the NLP component 108 can be performed by the data processing system 102 or the local computing device 140. For example, a local NLP component can execute on the local computing device 140 to perform aspects of converting the input audio signal to text and transmitting the text via data packets to the data processing system 102 for further natural language processing.

The audio input signal can be detected by the sensor 144 or transducer 146 (e.g., a microphone) of the local client computing device 140. Via the transducer 146, the audio driver 148, or other components the local client computing device 140 can provide the audio input signal to the data processing system 102 (e.g., via the network 105) where it can be received (e.g., by the interface 106) and provided to the NLP component 108 or stored in the data repository 122.

The local computing device 140 can include an audio driver 148, a transducer 146, a sensor 144 and a pre-processor component 150. The sensor 144 can receive or detect an input audio signal (e.g., voice input). The pre-processor component 150 can be coupled to the audio driver, the transducer, and the sensor. The pre-processor component 150 can filter the input audio signal to create a filtered input audio signal (e.g., by removing certain frequencies or suppressing noise). The pre-processor component 150 can convert the filtered input audio signal to data packets (e.g., using a software or hardware digital-to-analog converter). In some cases, the pre-processor component 150 can convert the unfiltered input audio signal to data packets and transmit the data packets to the data processing system 102. The pre-processor component 150 can transmit the data packets to a data processing system 102 comprising one or more processors and memory that execute a natural language processor component, an interface, a speaker recognition component, and a direct action application programming interface.

The data processing system 102 can receive, via the interface, from the pre-processor component, the data packets comprising the filtered (or unfiltered) input audio signal detected by the sensor. The data processing system 102 can identify an acoustic signature from the input audio signal. The data processing system 102 can identify, based on a lookup in a data repository (e.g., querying a database), an electronic account corresponding to the acoustic signature. The data processing system 102 can establish, responsive to identification of the electronic account, a session and an account for use in the session. The account can include a profile having one or more policies. The data processing system 102 can parse the input audio signal to identify a request and a trigger keyword corresponding to the request.

The data processing system 102 can provide, to the pre-processor component of the local computing device 140, a status. The local computing device 140 can receive the indication of the status. The audio driver can receive the indication of the status of the profile, and generate an output signal based on the indication. The audio driver can convert the indication to an output signal, such as sound signal, or acoustic output signal. The audio driver can drive the transducer 146 (e.g., speaker) to generate sound based on the output signal generated by the audio drive.

In some cases, the local computing device 140 can include a light source. The light source can include one or more LEDs, lights, display, or other component or device configured to provide an optical or visual output. The pre-processor component can cause the light source to provide a visual indication corresponding to the status. For example, the visual indication can be a status indicator light that turns on, a change in color of the light, a light pattern with one or more colors, or a visual display of text or images.

The NLP component 108 can obtain the input audio signal. From the input audio signal, the NLP component 108 can identify at least one request or at least one trigger keyword corresponding to the request. The request can indicate intent or subject matter of the input audio signal. The trigger keyword can indicate a type of action likely to be taken. The trigger keyword can be a wakeup signal or hotword that indicates to the local computing device 140 to convert the subsequent audio input into text and transmit the text to data processing system 102 for further processing. For example, the NLP component 108 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 108 can parse the input audio signal to identify, determine, retrieve, or otherwise obtain the request and the trigger keyword. For instance, the NLP component 108 can apply a semantic processing technique to the input audio signal to identify the trigger keyword or the request. The NLP component 108 can apply the semantic processing technique to the input audio signal to identify a trigger phrase that includes one or more trigger keywords, such as a first trigger keyword and a second trigger keyword. For example, the input audio signal can include the sentence "I want to purchase an audiobook." The NLP component 108 can apply a semantic processing technique, or other natural language processing technique, to the data packets comprising the sentence to identify trigger phrases "want to purchase" and "audiobook". The NLP component 108 can further identify multiple trigger keywords, such as purchase, and audiobook. For example, the NLP component 108 can determine that the trigger phrase includes the trigger keyword and a second trigger keyword.

The NLP component 108 can filter the input audio signal to identify the trigger keyword. For example, the data packets carrying the input audio signal can include "It would be great if I could get someone that could help me go to the airport", in which case the NLP component 108 can filter out one or more terms as follows: "it", "would", "be", "great", "if", "I", "could", "get", "someone", "that", "could", or "help". By filtering out these terms, the NLP component 108 may more accurately and reliably identify the trigger keywords, such as "go to the airport" and determine that this is a request for a taxi or a ride sharing service.

In some cases, the NLP component can determine that the data packets carrying the input audio signal includes one or more requests. For example, the input audio signal can include the sentence "I want to purchase an audiobook and monthly subscription to movies." The NLP component 108 can determine this is a request for an audio book and a streaming multimedia service. The NLP component 108 can determine this is a single request or multiple requests. The NLP component 108 can determine that this is two requests: a first request for a service provider that provides audiobooks, and a second request for a service provider that provides movie streaming. In some cases, the NLP component 108 can combine the multiple determined requests into a single request, and transmit the single request to a third-party device 156. In some cases, the NLP component 108 can transmit the individual requests to another service provider device, or separately transmit both requests to the same third-party device 156.

The data processing system 102 can include a direct action API 110 designed and constructed to generate, based on the trigger keyword, an action data structure responsive to the request. Processors of the data processing system 102 can invoke the direct action API 110 to execute scripts that generate a data structure to provide to a third-party device 156 or other service provider to obtain a digital component, order a service or product, such as a car from a car share service or an audiobook. The direct action API 110 can obtain data from the data repository 122, as well as data received with end user consent from the local client computing device 140 to determine location, time, user accounts, logistical or other information to allow the third-party device 156 to perform an operation, such as reserve a car from the car share service. Using the direct action API 110, the data processing system 102 can also communicate with the third-party device 156 to complete the conversion by in this example making the car share pick up reservation.

The direct action API 110 can execute a specified action to satisfy the end user's intention, as determined by the data processing system 102. Depending on the action specified in its inputs and the parameters or rules in the data repository 122, the direct action API 110 can execute code or a dialog script that identifies the parameters required to fulfill a user request. Such code can look-up additional information, e.g., in the data repository 122, such as the name of a home automation service, or third-party service, or it can provide audio output for rendering at the local client computing device 140 to ask the end user questions such as the intended destination of a requested taxi. The direct action API 110 can determine parameters and can package the information into an action data structure, which can then be sent to another component such as the content selector component 120 or to the service provider computing device 108 to be fulfilled.

The direct action API 110 can receive an instruction or command from the NLP component 108, or other component of the data processing system 102, to generate or construct the action data structure. The direct action API 110 can determine a type of action in order to select a template from the template repository 122 stored in the data repository 122. Types of actions can include, for example, services, products, reservations, tickets, multimedia content, audiobook, manage subscriptions, adjust subscriptions, transfer digital currency, make purchases, or music. Types of actions can further include types of services or products. For example, types of services can include car share service, food delivery service, laundry service, maid service, repair services, household services, device automation services, or media streaming services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The NLP component 108 can parse the input audio signal to identify a request and a trigger keyword corresponding to the request, and provide the request and trigger keyword to the direct action API 110 to cause the direct action API to generate, based on the trigger keyword, a first action data structure responsive to the request. The direct action API 110, upon identifying the type of request, can access the corresponding template from the template repository 122. Templates can include fields in a structured data set that can be populated by the direct action API 110 to further the operation that is requested via input audio detected by the local computing device 140 of the third-party device 156 (such as the operation of sending a taxi to pick up an end user at a pickup location and transport the end user to a destination location). The direct action API 110 can perform a lookup in the template repository 122 to select the template that matches one or more characteristic of the trigger keyword and request. For example, if the request corresponds to a request for a car or ride to a destination, the data processing system 102 can select a car sharing service template. The car sharing service template can include one or more of the following fields: device identifier, pick up location, destination location, number of passengers, or type of service. The direct action API 110 can populate the fields with values. To populate the fields with values, the direct action API 110 can ping, poll or otherwise obtain information from one or more sensors 144 of the computing device 140 or a user interface of the device 140. For example, the direct action API 110 can detect the source location using a location sensor, such as a GPS sensor. The direct action API 110 can obtain further information by submitting a survey, prompt, or query to the end of user of the computing device 140. The direct action API can submit the survey, prompt, or query via interface 106 of the data processing system 102 and a user interface of the computing device 140 (e.g., audio interface, voice-based user interface, display, or touch screen). Thus, the direct action API 110 can select a template for the action data structure based on the trigger keyword or the request, populate one or more fields in the template with information detected by one or more sensors 144 or obtained via a user interface, and generate, create or otherwise construct the action data structure to facilitate performance of an operation by the third-party device 156.

To construct or generate the action data structure, the data processing system 102 can identify one or more fields in the selected template to populate with values. The fields can be populated with numerical values, character strings, Unicode values, Boolean logic, binary values, hexadecimal values, identifiers, location coordinates, geographic areas, time-stamps, or other values. The fields or the data structure itself can be encrypted or masked to maintain data security.

Upon determining the fields in the template, the data processing system 102 can identify the values for the fields to populate the fields of the template to create the action data structure. The data processing system 102 can obtain, retrieve, determine or otherwise identify the values for the fields by performing a look-up or other query operation on the data repository 122.

In some cases, the data processing system 102 can determine that the information or values for the fields are absent from the data repository 122. The data processing system 102 can determine that the information or values stored in the data repository 122 are out-of-date, stale, or otherwise not suitable for the purpose of constructing the action data structure responsive to the trigger keyword and request identified by the NLP component 108 (e.g., the location of the local client computing device 140 may be the old location and not be the current location; an account can be expired; the destination restaurant may have moved to a new location; physical activity information; or mode of transportation).

If the data processing system 102 determines that it does not currently have access, in memory of the data processing system 102, to the values or information for the field of the template, the data processing system 102 can acquire the values or information. The data processing system 102 can acquire or obtain the information by querying or polling one or more available sensors of the local client computing device 140, prompting the end user of the local client computing device 140 for the information, or accessing an online web-based resource using an HTTP protocol. For example, the data processing system 102 can determine that it does not have the current location of the local client computing device 140, which may be a needed field of the template. The data processing system 102 can query the local client computing device 140 for the location information. The data processing system 102 can request the local client computing device 140 to provide the location information using one or more location sensors 144, such as a Global Positioning System sensor, WIFI triangulation, cell tower triangulation, Bluetooth beacons, IP address, or other location sensing technique.

In some cases, the data processing system 102 can generate the action data structure using the second profile. The data processing system 102 can then determine whether the action data structure generated using the second profile is compliant with the first profile. For example, the first profile can include a policy to block a type of action data structure, such as purchasing a product from an electronic online retailer via the local computing device 140. The input audio detected by the local computing device 140 may have included a request to purchase a product from the electronic online retailer. The data processing system 102 may have used the second profile to identify account information associated with the electronic online retailer, and then generated an action data structure to purchase the product. The action data structure can include the account identifier corresponding to the electronic account associated with the acoustic signature identified by the speaker recognition component 112.

The data processing system 102 can include a speaker recognition component 112 that is designed, constructed and operational to receive an audio input signal detected by the local computing device 140, identify an acoustic signature, and identify an electronic account corresponding to the acoustic signature. The speaker recognition component 112 can receive, via interface 106, data packets that include an input audio signal detected by a sensor 144 or transducer 146 of the local computing device 140. The speaker recognition component 112 can identify an acoustic signature from the input audio signal. The speaker recognition component 112 can identify, based on a lookup in the data repository 122, an electronic account corresponding to the acoustic signature.

The speaker recognition component 112 can receive data packets having a payload carrying the input audio signals. The speaker recognition component 112 can perform a pre-filtering or pre-processing on the input audio signal to remove certain frequencies of audio. The pre-filtering can include filters such as a low-pass filter, high-pass filter or a bandpass filter. The filters can be applied in the frequency domain. The filters can be applied using a digital signal processing technique. The filter can be configured to keep frequencies that correspond to a human voice or human speech, while eliminating frequencies that fall outside the typical frequencies of human speech. For example, a bandpass filter can be configured to remove frequencies bellow a first threshold (e.g., 70 Hz, 75 Hz, 80 Hz, 85 Hz, 90 Hz, 95 Hz, 100 Hz, or 105 Hz) and above a second threshold (e.g., 200 Hz, 205 Hz, 210 Hz, 225 Hz, 235 Hz, 245 Hz, or 255 Hz). Applying a bandpass filter can reduce computing resource utilization in downstream processing. In some cases, the pre-processor 150 on the local computing device 140 can apply the bandpass filter prior to transmitting the input audio signal to the data processing system 102, thereby reducing network bandwidth utilization. However, based on the computing resources available to the local computing device 140, it may be more efficient to provide the input audio signal to the data processing system 102 to allow the data processing system 102 to perform the filtering.

The speaker recognition component 112 can apply additional pre-processing or pre-filtering techniques to facilitate identifying the electronic account corresponding to the speaker. For example, the speaker recognition component 112 can apply noise reduction techniques to reduce ambient noise levels that can interfere with speaker recognition. Noise reduction techniques can improve accuracy and speed of speaker recognition, thereby improving the performance of the data processing system 102 in identifying the electronic account.

The speaker recognition component 112 can access signatures 124 stored in the data repository 122. The speaker recognition component 112 can analyze the filtered input audio signal to identify signature, and use the signature to identify an electronic account. Thus, the speaker recognition component 112 can perform speaker recognition or voice recognition to identify an electronic account corresponding to the signature of the input audio signal.

The speaker recognition component 112 can be configured with one or more speaker recognition techniques, such as pattern recognition. The speaker recognition component 112 can be configured with a text-independent speaker recognition process. In a text-independent speaker recognition process, the text used to establish the electronic account can be different from the text used to later recognize the speaker.

For example, the speaker recognition component 112 can identify acoustic features in the input audio signal that differ between input speech sources. The acoustic features can reflect physical or learned patterns that can correspond to a unique input speech source. Acoustic features can include, for example, voice pitch or speaking style. Techniques used to identify, process and store signatures can include frequency estimation (e.g., instantaneous fundamental frequency, or discrete energy separation algorithm), hidden Markov models (e.g., a stochastic model used to model randomly changing systems where the future stated depends on the current state, and in which the system being modeled has unobserved states), Gaussian mixture models (e.g., a parametric probability density function represented as a weighted sum of Gaussian component densities), pattern matching algorithms, neural networks, matrix representation, Vector Quantization (e.g., a quantization technique from signal processing that allows the modeling of probability density functions by the distribution of prototype vectors), or decision trees. Additional techniques can include anti-speaker techniques, such as cohort models, and world models. The speaker recognition component 112 can be configured with a machine learning model to facilitate pattern recognition or adapt to speaker characteristics.

Upon identifying the acoustic signature in the input audio signal, the speaker recognition component 112 can perform a lookup in the data repository 122 or signature data structure (e.g., signatures and accounts 124). The signatures stored in the signature data structure can map to an identifier of an electronic account. The speaker recognition component 112 can perform the lookup in the signature data structure using the signature identified in the input audio signal to retrieve the electronic account corresponding to the signature of the input audio.

In some cases, the speaker recognition component 112 can determine, based on the lookup, an absence of the electronic account corresponding to the acoustic signature. For example, the signature may not be stored in the signature data structure 124 or an electronic account for the signature may not yet have been established. The lookup may return a null value or empty set. Responsive to determining the absence of the signature or an electronic account, the speaker recognition component 112 can create the electronic account in the data repository. The speaker recognition component 112 can update the signature data structure 124 to include a new signature constructed from the input audio signal and a corresponding electronic account. The speaker recognition component 112 can map the electronic account to the new acoustic signature.

Thus, the data processing system 102 can include an interactive data exchange component 104 that can receive, via an interface 106 of the data processing system 102, data packets comprising an input audio signal detected by a sensor 144 of a local computing device 140 (e.g., a first client device or first digital assistant device) linked with an account identifier. The interactive data exchange component 104 can parse, based on a natural language processing technique (e.g., by the NLP component 108), the data packets comprising the input audio signal to identify a request for a digital component and one or more keywords corresponding to the request. The interactive data exchange component 104 can establish a session with the local computing device 140 and generate, based on a policy or rule 136 for the digital component stored in a digital access control database 132, an input prompt with a field responsive to the request for the digital component by the first client device linked with the account identifier.

For example, the interactive data exchange component 104 can communicate with the access control database 132 or access controller component 114 to determine that to satisfy the request, additional input may be needed. The additional input can be user credential, electronic account information, payment information, transaction information, or authentication information. The interactive data exchange component 104, in communication with the data repository 122 or access controller component 114, can generate an input prompt using the template 130. The template 130 can be for a value of a parameter 134 as determined by a rule 136 established for the requested digital component 138. For example, if the request is to listen to an audiobook, the data processing system 102 can generate an input prompt for information about how the user would like to pay for the audio, if the user would like to stream the audiobook or download the audio book, if the user would like to setup a monthly subscription to the audiobook provider, if the user would like to establish a one-time streaming-only configuration, or any other type of configuration available or provided by a third-party device 156 that provides the audiobook service. Thus, the input prompt can include one or more fields with one or input text boxes or drop down menus or buttons or other graphical user interface widget. The data processing system 102 may convert the input text box for a conversational computing environment. The data processing system 102 may determine that the input text box is not suitable for a voice-based conversational computing environment, for example the data processing system 102 may determine that converting the input text box may be cumbersome, inefficient, less secure, processor intensive, or cause delay in the transaction.

The data processing system 102 can include, interface with or otherwise access a compatibility checker component 116 designed, constructed and operative to determine whether the input prompt is compatible with the local computing device 140. The data processing system 102 can determine that the input prompt is incompatible with a first client device linked to the account of the user. The data processing system 102 can determine the input prompt is compatible with a second client device linked to the account of the user.

The compatibility checker component 116 can determine the types of inputs or outputs associated with the generated input prompt. The compatibility checker component 116 can receive device information associated with the local computing device 140. The compatibility checker component 116 can compare the types of inputs or outputs associated with the generated input prompt with the input and output interfaces available on the local computing device 140. If the compatibility checker component 116 determines that a type of input required for the generated input prompt is not available on the local computing device 140, then then the compatibility checker component 116 can determine that the local computing device 140 is incompatible with the generated input prompt. For example, the input prompt can require the input of an electronic transaction account number, but the local computing device 140 may not include a keyboard, mouse or touch screen. Thus, the local computing device 140 may not provide a mechanism by which to input the electronic account number. While it may be possible to provide an audio signal or voice the numbers, the data processing system 102 can determine that it may not be secure to vocally provide electronic account information. Thus, the data processing system 102 can determine incompatibility.

The compatibility checker component 116 can determine that the local computing device 140 is a public or unsecured computing device 140, not secure enough to receive account information or authentication information, and therefore incompatible. The compatibility checker component 116 can use various policies or techniques to determine incompatibility based on resource consumption, device configuration, interface availability, preferences, or security. The compatibility checker component 116 can determine the policy based on a rule for the digital component requested by the user. For example, the rule for the requested digital component can be biometric authentication such as fingerprint as a preferred authentication technique, but the local computing device 140 may not include a biometric sensor. Thus, the compatibility checker component 116 can determine the local computing device 140 is incompatible for the generated input prompt.

Upon determining the local computing device 140 is incompatible with the generated input prompt, the data processing system 102 can identify a second computing device. For example, the data processing system 102 can include, interface with or otherwise access a session transfer component 118 designed, constructed and operative to identify, responsive to the determination that the input prompt is incompatible with the first client device, a status of a second client device linked with the account identifier that is linked with the first client device. The first and second client devices can include one or more component or functionality of the local computing device 140. The second client device can be compatible with the input prompt because it can include the required input interface, output interface, application, program, computational resources or other functionality.

To identify the second client device, the data processing system 102 (e.g., via session transfer component 118) can poll one or more devices linked with the account as indicated in the linked devices data structure 126. The data processing system 102 can perform a lookup in the linked devices data structure 126 using the account identifier to determine the device identifiers of the linked devices, and then poll such devices. The data processing system 102 can use other polling techniques to identify nearby devices or devices connected to the first client device (e.g., via a wireless connection). The session transfer component 116 can receive device information for the second client device to determine a status of the client device. The status can indicate the availability of an input interface, output interface, computational resource or other functionality used to populate or satisfy or respond to the generated input prompt. For example, the session transfer component 118 can poll the second client device for status information as to availability of a keyboard input or touchscreen input interface, and the status information can indicate that a touchscreen interface is available.

The compatibility checker component 116 can determine that the input prompt is compatible with the second client device based on the status identified by the session transfer component. The compatibility checker component 116 can then instruct the session transfer component to 116 to handover the session. The session transfer component 118 can handover the session to the second client device and terminate a portion of the session with the first client device. Handing over the session can refer to or include transferring the session with the first device to the second device. Handing over the session can refer to or include initiating a session to perform the requested electronic transaction with the second device. Handing over the session can refer to or include terminating the session with the first client device, and then resuming the session with the second client device. Handing over the session can refer to or include initiating a second session with the second client device. Handing over the session can refer to or include providing information associated with the portion of the session conducted via the first client device to the second client device. Handing over the session can refer to or include transmitting or forwarding the generate input prompt to the second client device.

The session can include or refer to an access control session. The access control session can refer to or include one or more data communications or connections that are associated with obtaining, requesting, granting or authorizing access to a digital component. The data processing system 102 can initiate the access control session responsive to the input audio signal detected via the first client device (e.g., local computing device 140). The data processing system 102 can pause the access control session on the first client device responsive to determining that the generated input prompt is not compatible with the local computing device 140 or first client device. The data processing system 102 can handover the access control session from the first client device to the second client device. The data processing system 102 can terminate the access control session responsive to the data packets input via the second client device responsive to the input prompt.

Upon transferring or handing over the session, the interactive data exchange component 104 can transmit, responsive to the handover, the input prompt to the second client device. The interactive data exchange component 104 can receive data packets input via the second client device responsive to the input prompt.

The data processing system 102 can include, interface with or otherwise access an access controller component 114 designed, constructed and operative to modify, based on the data packets input via the second client device, a parameter for the digital component stored in the digital access control database for the account identifier. The access controller component 114 can maintain the access control database 132. The access controller component 114 can modify, adjust, manipulate or update the access control database 132. For example, the access controller component 114 can update a subscription service parameter stored in the access control database 132 for a digital component to indicate a monthly subscription, a one-time view, a yearly subscription, or other purchase type. For example, the access controller component 114 can update a value for a parameter for the digital component for the account to indicate that devices linked with the account are authorized to execute, render, process or otherwise present the digital component.

The access controller component 114 can maintain subscription, purchase or access information for any type of digital component in the access control database 132. The access controller component 114 can be configured to parse or process rules 136 corresponding to a type of digital component 138 to update values for parameters 134. The access controller component 114 can receive updated or new rules from third-party devices 156 or other providers of the digital component, and store the updated or new rules in access control database 132. Thus, the access controller component 114 can maintain, modify, add, remove, delete or otherwise manipulate or adjust access controls for digital components on behalf of, or in addition to, the third-party device 156.

The data processing system 102 can then provide the digital component for execution by a client device. For example, the data processing system 102 can receive a request to execute the digital component on a third client device linked with the account identifier. The data processing system 102 (e.g., via access controller component 114) can validate that the second client device has access to the digital component based on the parameter information stored in the digital access control database for the account identifier. The data processing system 102 (e.g., via compatibility checker component 116) can determine that the digital component is compatible with the third client device. For example, the type of application needed to execute, present or render the digital component is available on the third client device (e.g., application version, operating system version); the computational resources (e.g., processor speed, memory, bandwidth, storage) is sufficient to process or execute the digital component; or the interfaces (e.g., display, input, keyboard, touchscreen, sensors, accelerometer, GPS, or speakers) used to present the digital component are available on the client device. The compatibility checker component 114 can poll the third client device to obtain status information to determine compatibility. Thus, responsive to validating access and compatibility of the digital component, the data processing system 102 can provide the digital component for execution by the third client device.

The compatibility checker component 116 can determine that the digital component requested by the device is not compatible for execution by the device based on the status of the device. The data processing system 102 can convert a format of the digital component based on the status of the third client device. The data processing system 102 can convert the digital component from a first format to a second format responsive to the compatibility information or status information. For example, the device can include a display with a first resolution; the data processing system 102 can then adjust the resolution of the digital component to be compatible with the display. The device can be configured with a graphic driver capable of two-dimensional images and video instead of three-dimensional video; the data processing system 102 can convert the digital component for two-dimensional display.

The data processing system 102 (e.g., the compatibility checker 116) can identify a plurality of client devices linked with the account identifier. The compatibility checker 116 can identify a subset of the plurality of client devices that are compatible with the digital component. The compatibility checker 116 can provide, responsive to modification of the parameter, the digital component for execution on the subset of the plurality of client devices. Thus, the access controller component 114 can modify the parameter by providing authorization to execute the digital component by the third client device. The access controller component 114 can determine a type of the parameter based on a type of the digital component, and modify the parameter based on the type.

For example, the data processing system 102 can include a content selector component 120 designed, constructed, configured or operational to select digital component objects. To select digital components for display in a voice-based environment, the data processing system 102 (e.g., via NLP component 108) can parse the input audio signal to identify keywords (e.g., a trigger keyword), and use the keywords to select a matching digital component based on a broad match, exact match, or phrase match. For example, the content selector component 120 can analyze, parse, or otherwise process subject matter of candidate digital components to determine whether the subject matter of the candidate digital components correspond to the subject matter of the keywords or phrases of the input audio signal detected by the microphone of the local client computing device 140. The content selector component 120 may identify, analyze, or recognize voice, audio, terms, characters, text, symbols, or images of the candidate digital components using an image processing technique, character recognition technique, natural language processing technique, or database lookup. The candidate digital components may include metadata indicative of the subject matter of the candidate digital components, in which case the content selector component 120 may process the metadata to determine whether the subject matter of the candidate digital component corresponds to the input audio signal.

The content selector component 120 can further utilize information provided in the profile stack to perform content selection. The content selector component 120 can utilize the second profile layer, which can correspond to the electronic account associated with the speaker that provided the input audio signal detected by the local computing device 140. The content selector 120 can also use information associated with the first profile layer, which can correspond to the default profile layer that was provided by the third-party device 156. The content campaign provided by the content provider 154 can include content selection criteria that the data processing system 102 can match to criteria indicated in the second profile layer or the first profile layer.

Content providers 154 may provide additional indicators when setting up a content campaign that includes digital components. The content provider 154 may provide information at the content campaign or content group level that the content selector component 120 may identify by performing a lookup using information about the candidate digital component. For example, the candidate digital component may include a unique identifier, which may map to a content group, content campaign, or content provider. The content selector component 120 may determine, based on information stored in content campaign data structure in data repository 122, information about the content provider 154.

The data processing system 102 can receive, via a computer network, a request for content for presentation on a computing device 140. The data processing system 102 can identify the request by processing an input audio signal detected by a microphone of the local client computing device 140. The request can include selection criteria of the request, such as the device type, location, and a keyword associated with the request. The request can include the action data structure or action data structure.

Responsive to the request, the data processing system 102 can select a digital component object from data repository 122 or a database associated with the content provider 154, and provide the digital component for presentation via the computing device 140 via network 105. The digital component object can be provided by a content provider device 154 different from the third-party device 156. The digital component can correspond to a type of service different from a type of service of the action data structure (e.g., taxi service versus food delivery service). The computing device 140 can interact with the digital component object. The computing device 140 can receive an audio response to the digital component. The computing device 140 can receive an indication to select a hyperlink or other button associated with the digital component object that causes or allows the computing device 140 to identify the content provider device 154 or third-party device 156, request a service from the content provider device 154 or third-party device 156, instruct the content provider device 154 or third-party device 156 to perform a service, transmit information to the content provider device 154 or third-party device 156, or otherwise query the content provider device 154 or third-party device 156.

The data processing system 102 (e.g., via interface 106 and network 105) can transmit data packets comprising the output signal that is responsive to the input audio signal, or request or query thereof. The output signal can cause the audio driver component 138 of or executed by the local computing device 140 to drive a speaker (e.g., transducer 146) of the local computing device 140 to generate an acoustic wave corresponding to the output signal.

Figure 2:
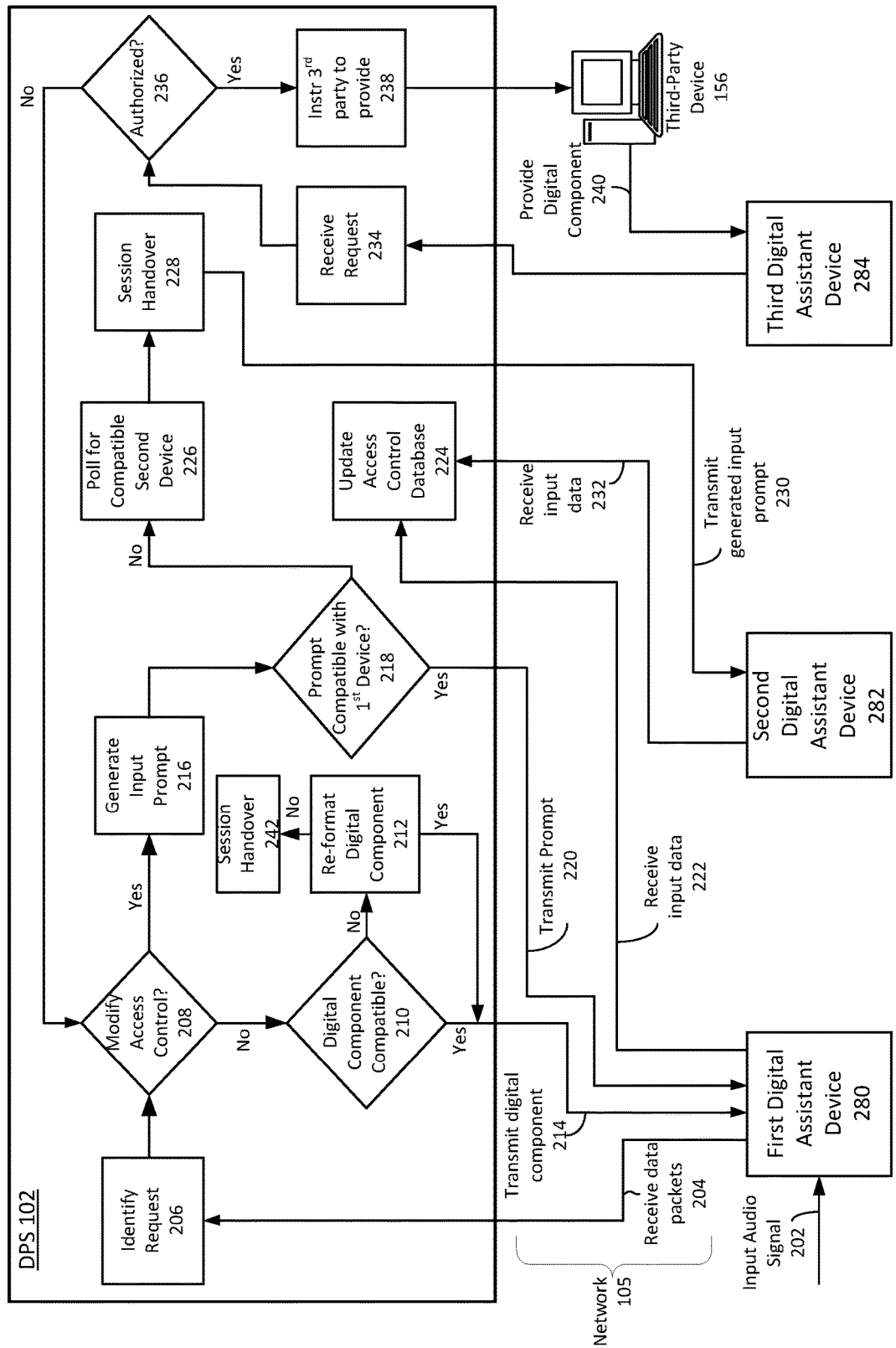
FIG. 2 is an illustration of an example operation of a system to synchronize access controls between computing devices.

FIG. 2 is an illustration of the operation of system 200 to synchronize access controls between computing devices. The system 200 can include one or more component of system 100 depicted in FIG. 1 or system 400 depicted in FIG. 4. For example, system 200 can include a data processing system 102. The system 200 can include or interface or communicate with a first digital assistant device 280, second digital assistant device 282 or third digital assistant device 284. The first, second and third digital assistant devices 280, 282 and 284 can include one or more component or functionality of local computing device 140. The first, second and third digital assistant devices 280, 282 and 284 can include different functionality or interfaces relative to one another. For example, the first digital assistant device 280 can be a speaker digital assistant that does not include a display device 152; the second digital assistant device 282 can be a mobile computing device that includes a touch screen; and the third digital assistant device 284 can be a laptop computer.

At ACT 202, the first digital assistant device 280 receives an input audio signal. The input audio signal can include a request, one or more keywords, or a trigger phrase or keyword. The input audio signal can include a query for access to content. For example, the input audio signal can be "I would like to sign up for a monthly subscription to Company_A streaming service." The input audio signal can be "I want to purchase AudioBook_B". The input audio signal can be "I want to purchase Album_C using digital currency_D." The input audio signal an be "I want to get a free trial version of VideoGame_E."

At ACT 204, the first digital assistant device 280 can transmit the input audio signal (or text version or data packets thereof) to data processing system 102 via network 105. The data processing system 102 can receive the data packets. The data processing system 102 can identify the request at ACT 206. For example, the data processing system 102 can identify the request using an NLP component of an interactive data exchange component of the data processing system 102.

At ACT 208, the data processing system 102 can perform a decision block as to whether to modify access control. The decision block can refer to or include the data processing system determining whether to modify access control parameters in order to provide the digital component. The decision block can refer to or include the data processing system 102 determining whether the first digital assistant device 280 is already authorized to access the requested digital component. If, at decision block corresponding to ACT 208, the data processing system 102 determines that it is not necessary modify the access control parameter for the requested digital component for the account identifier corresponding to the first digital assistant device 280, the data processing system can proceed to decision block 210 to determine whether the digital component is compatible for execution by the first digital assistant device 280. If, at decision block 210, the data processing system 102 determines the digital component is compatible with the first digital assistant device 280 (e.g., based on status or device information of the first digital assistant device 280), the data processing system can transmit, at ACT 214, the digital component to the first digital assistant device 280 for execution.

However, if the data processing system 102 determines at decision block 210 that the digital component is not compatible with the first digital assistant device 280, the data processing system 102 can determine, at ACT 212, to re-format the digital component to be compatible with the first digital assistant device 280. If the data processing system 102 can re-format the digital component at ACT 212, then the data processing system 102 proceeds to reformat and transmits, at ACT 214, the re-formatted digital component to the first digital assistant device 280 for execution. If the data processing system 102 cannot re-format the digital component to a compatible format, the data processing system 102 proceeds to a session handover at ACT 242 or can exit the loop. The session handover at ACT 242 can include identifying a compatible digital assistant device linked to the account, and transmitting the digital component for execution on the linked, compatible digital assistant device.

If, at decision block 208, the data processing system 102 determines to modify access control parameters, the data processing system can proceed to generate an input prompt at ACT 216. The data processing system 102 can generate an input prompt based on a type of digital component requested and rules associated with the type of digital component. The data processing system 102 can generate the input prompt with one or more fields in which a values can be input. At ACT 218, the data processing system 102 can determine whether the generated input prompt is compatible with the first digital assistant device 280. If the generated input prompt is compatible with the first digital assistant device, the data processing system 102 can transmit the generated input prompt to the first digital assistant device at ACT 220. The data processing system 102 can receive the input data at ACT 22 that is responsive to the input prompt. For example, the data processing system 102 can receive account information, selections, payment information, time interval information, preferences or other information. At ACT 224, the data processing system 102 can update the access control data base with the received input data from the first digital assistant device 280.

If, however, at ACT 218 the data processing system 102 determines that the generated input prompt is not compatible with the first digital assistant device 280, the data processing system can poll for compatible second device at ACT 226. The data processing system 102 can broadcast a poll or ping to identify devices within range of the first digital assistant device 280. For example, the data processing system 102 can instruct the first digital assistant device 280 to broadcast a poll or ping or beacon using a communication protocol or broadcast protocol to identify other digital assistant devices 282. The data processing system 102 can perform a lookup in a linked devices data structure to identify other devices that are linked to the account with which the first digital assistant device 280 is linked.

Upon identifying a second digital assistant device 282, the data processing system can perform a session handover at ACT 228. The data processing system 102 can pause, hold, or terminate the session previously established with the first digital assistant device 280, or initiate via the first assistant device 280. The data processing system 102 can handover the session because the data processing system 102 can determine that the first digital assistant device 280 is not compatible or operative to perform further processing or functions associated with adjusting access controls to execute the digital component.

At ACT 230, and in response to the session handover at ACT 228, the data processing system 102 can transmit the generated input prompt to the second digital assistant device 282. The second digital assistant device 282 can provide input data at ACT 232 in response to receiving the generated input prompt at ACT 230. The data processing system 102, at ACT 224, can update the access control database to adjust, update, modify or add a parameter and value for the digital component for the account.

At ACT 234, the data processing system 102 can receive a request from a third digital assistant device 284 for the digital component. The data processing system 102 can determine, at decision block 236, whether the third digital assistant device 284 is authorized to execute, access, receive or otherwise use the digital component. If, at decision block 236, the data processing system determines that the third digital assistant device 284 is authorized to access to the requested digital component (e.g., based on a lookup of the updated parameter in the access control database 132), the data processing system 102 can instruct, at ACT 238, a third-party device 156 to provide the digital component to the third digital assistant device 284. The third-party device 256 can provide, at ACT 240, the digital component to the third digital assistant device 284 for execution.

If, however, the data processing system 102 determines that the third digital assistant device 284 is not authorized to access the digital component at ACT 236 (e.g., parameter only allows access to the second digital assistant device or the access time interval or geographic boundary has expired), then the data processing system 102 can proceed to ACT 208 to modify the access control parameter for the digital component.

Thus, the data processing system 102 can centrally manage the access controls for different types of digital components and across different types of digital assistant devices so that a third-party device 156 or provider of the digital component may not have to. The third-party device 156 can provide the digital component responsive to an instruction to provide the digital component from the data processing system 102, while the data processing system 102 performs the functions to determine whether the digital assistant device is authorized to receive the digital component, as well as allow the digital assistant device to purchase the digital component. The data processing system 102 can perform electronic transactions using digital currency that can be obtained from a first digital assistant device and then used on a second digital assistant device. For example, a second digital assistant device can receive the digital currency, but a user can use a third digital assistant device to spend or exchange the digital currency with another digital component.

The first, second and third digital assistant devices 280, 282, and 284 can be different physical devices, or applications or surfaces executing or provided by one or more devices.

The data processing system can receive a request from the third client device to execute a second digital component. The data processing system can determine, based on a parameter stored for the second digital component in the access control database, that the third client device is unauthorized to execute the second digital component (e.g., decision block 236 depicted in FIG. 2). The data processing system can transmit, to the second client device, an input prompt for the second digital component (e.g., ACTs 208, 216, 218, 226, 228, 230 depicted in FIG. 2). The data processing system can authorize the third client device responsive to input provided via second client device.

The data processing system can identify a plurality of fields in the input prompt. The data processing system can generate audio queries for each of the plurality fields. The data processing system can receive one or more input audio signals responsive to the audio queries generated for each of the plurality of fields. For example, the rules for the digital component can indicate to generate an input prompt with fields that are configured for conversion to audio and receive audio input. The data processing system can determine to provide the input prompt to the first digital assistant device (e.g., ACTs 218 and 220 depicted in FIG. 2).

The first client device (or digital assistant device 280) can execute a first surface or user interface type, the second client device (or digital assistant device 282) can execute a second surface or user interface type, and the third client device (or digital assistant device 284) can execute a third surface or user interface type different from the first surface and the second surface. The data processing system can provide the digital component for execution by the third surface and the second surface.

One or more client devices can store account information in local storage or memory. For example, the data processing system can provide, for storage in memory of the third client device, the parameter for the digital component on the digital access control database for the account identifier. The data processing system can update, responsive to the data packets input via the second client device responsive to the input prompt, the parameter for the digital component stored in the memory of the third client device.

Figure 3:
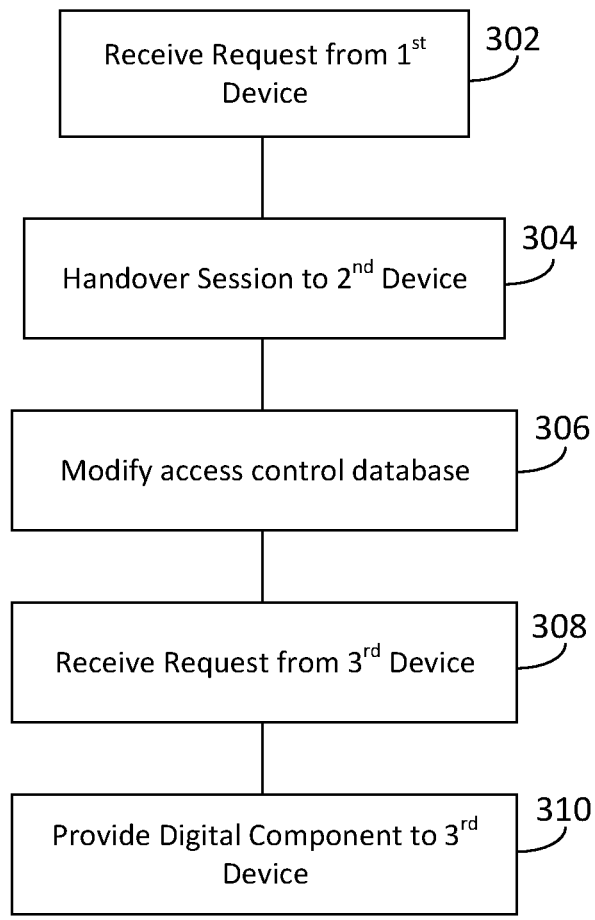
FIG. 3 is an illustration of an example method of synchronizing access controls between computing devices.

FIG. 3 is an illustration of an example method of synchronizing access controls between computing devices. The method 300 can be performed by one or more component, system or element of system 100 depicted in FIG. 1, system 200 depicted in FIG. 2, or system 400 depicted in FIG. 4. For example, the method 300 can be performed by a data processing system. At ACT 302, the data processing system can receive a request from a first device. The data processing system can receive data packets comprising an input audio signal detected by a sensor of a first client device linked with an account identifier. The data processing system can parse, based on a natural language processing technique, the data packets comprising the input audio signal to identify a request for a digital component and one or more keywords corresponding to the request. The data processing system can establish a session with the first client device. The data processing system can generate, based on a policy (or rule) for the digital component stored in a digital access control database, an input prompt with a field responsive to the request for the digital component by the first client device linked with the account identifier.

At ACT 304, the data processing system can handover the session to a second device. For example, the data processing system can determine that the input prompt is incompatible with the first client device. The data processing system can identify, responsive to the determination that the input prompt is incompatible with the first client device, a status of a second client device linked with the account identifier that is linked with the first client device. The data processing system can determine that the input prompt is compatible with the second client device based on the status identified by the session transfer component. The data processing system can perform, responsive to the determination, a handover of the session to the second client device and terminate a portion of the session with the first client device. The data processing system can transmit, responsive to the handover, the input prompt to the second client device.

At ACT 306, the data processing system can modify an access control database. For example, the data processing system can receive data packets input via the second client device responsive to the input prompt. The data processing system can modify, based on the data packets input via the second client device, a parameter for the digital component stored in the digital access control database for the account identifier.

At ACT 308, the data processing system can receive a request from a third device. The data processing system can receive a request to execute the digital component on a third client device linked with the account identifier. At ACT 310, the data processing system can provide a digital component to the third device. The data processing system can provide, responsive to validation by the access controller component of the parameter for the digital component stored in the digital access control database for the account identifier and a determination by the compatibility checker component that the digital component is compatible with the third client device, the digital component for execution by the third client device.

Figure 4:
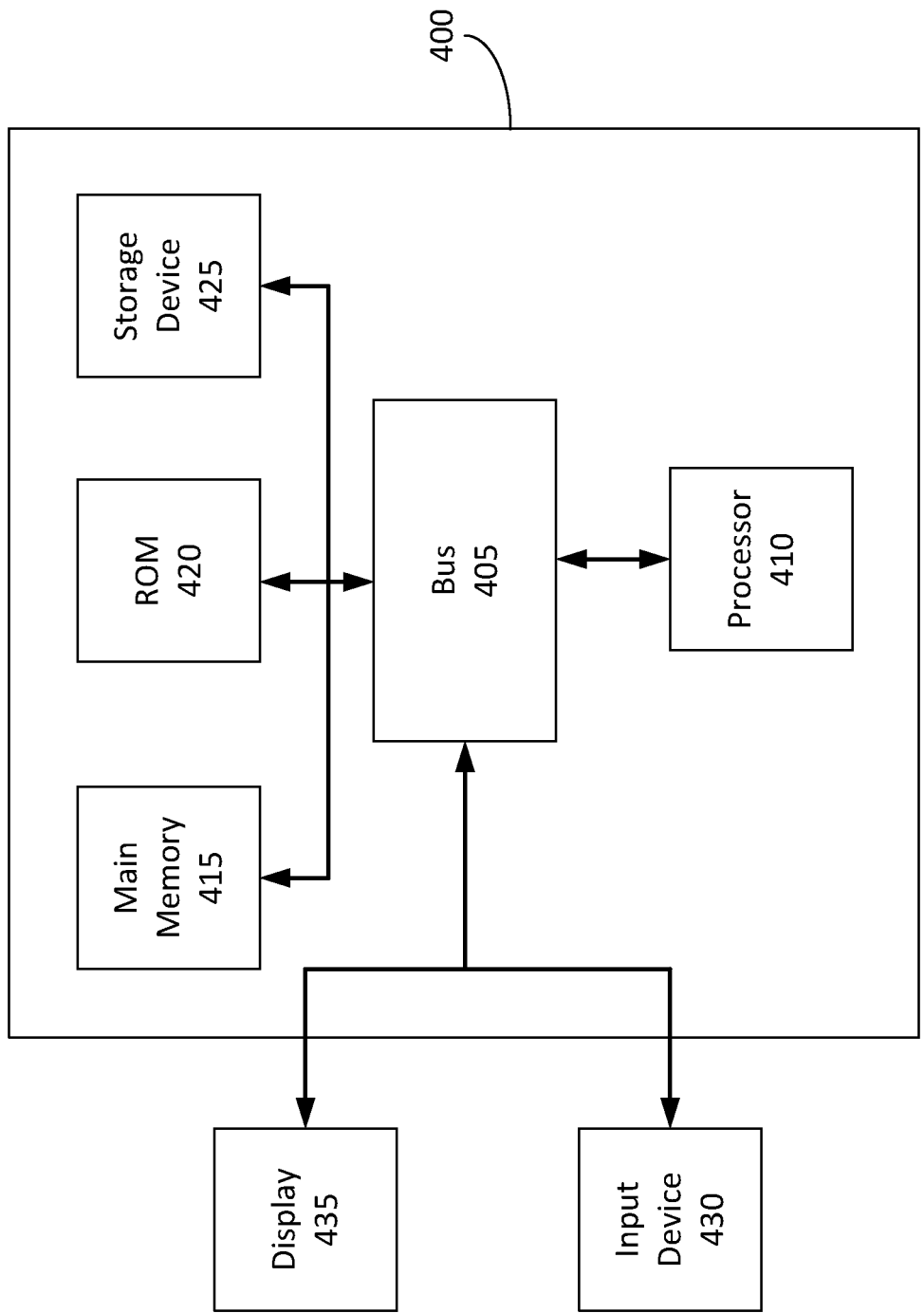
FIG. 4 is a block diagram illustrating a general architecture for a computer system that can be employed to implement elements of the systems and methods described and illustrated herein, including, for example, the systems depicted in FIGS. 1 and 2, and the method depicted in FIG. 3.

FIG. 4 is a block diagram of an example computer system 400. The computer system or computing device 400 can include or be used to implement the system 100, or its components such as the data processing system 102, or system 600 or its components such as the state engine 634. The data processing system 102 can include an intelligent personal assistant or voice-based digital assistant. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 145. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 145.

The computing system 400 may be coupled via the bus 405 to a display 435, such as a liquid crystal display, or active matrix display, for displaying information to a user. An input device 430, such as a keyboard including alpha-numeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 140 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the direct action API 110, content selector component 120, or NLP component 108 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the local computing device 140 or the content provider computing device 154 or the third-party device 156).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 108 or the content selector component 120, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to synchronize access controls between devices to process an operation, comprising:
    an interactive data exchange component executed by a data processing system comprising one or more processors and memory to:
        receive, via an interface of the data processing system, data packets comprising an input audio signal detected by a sensor of a first client device linked with an account identifier;
        parse, based on a natural language processing technique, the data packets comprising the input audio signal to identify a request for a digital component and one or more keywords corresponding to the request; and
        establish a session with the first client device and generate, based on a policy for the digital component stored in a digital access control database, an input prompt with a field responsive to the request for the digital component by the first client device linked with the account identifier;
    a compatibility checker component executed by the data processing system to determine that the input prompt is incompatible with the first client device;
    a session transfer component executed by the data processing system to identify, responsive to the determination that the input prompt is incompatible with the first client device, a status of a second client device linked with the account identifier that is linked with the first client device;

the compatibility checker to determine that the input prompt is compatible with the second client device based on the status identified by the session transfer component;

the session transfer component to handover the session to the second client device and terminate a portion of the session with the first client device;

the interactive data exchange component to:
transmit, responsive to the handover, the input prompt to the second client device; and
receive data packets input via the second client device responsive to the input prompt;

an access controller component executed by the data processing system to modify, based on the data packets input via the second client device, a parameter for the digital component stored in the digital access control database for the account identifier; and the interactive data exchange component to:
receive a request to execute the digital component on a third client device linked with the account identifier; and
provide, responsive to validation by the access controller component of the parameter for the digital component stored in the digital access control database for the account identifier and a determination by the compatibility checker component that the digital component is compatible with the third client device, the digital component for execution by the third client device.

2. The system of claim 1, comprising the data processing system to:
identify a plurality of client devices linked with the account identifier;
identify a subset of the plurality of client devices that are compatible with the digital component; and
provide, responsive to modification of the parameter, the digital component for execution on the subset of the plurality of client devices.

3. The system of claim 1, comprising the data processing system to:
convert a format of the digital component based on the status of the third client device.

4. The system of claim 1, comprising the data processing system to:
receive a request from the third client device to execute a second digital component;
determine, based on a parameter stored for the second digital component in the access control database, that the third client device is unauthorized to execute the second digital component;
transmit, to the second client device, an input prompt for the second digital component; and
authorize the third client device responsive to input provided via the second client device.

5. The system of claim 1, comprising the data processing system to:
store one or more rules in the access control database for the digital component.

6. The system of claim 1, comprising the data processing system to:
modify the parameter to provide authorization to execute the digital component by the third client device.

7. The system of claim 1, comprising the data processing system to:
determine a type of the parameter based on a type of the digital component; and
modify the parameter based on the type.

8. The system of claim 1, comprising the data processing system to:
identify a plurality of fields in the input prompt;
generate audio queries for each of the plurality of fields; and
receive one or more input audio signals responsive to the audio queries generated for each of the plurality of fields.

9. The system of claim 1, wherein the session comprises an access control session, comprising the data processing system to:
initiate the access control session responsive to the input audio signal detected via the first client device;
pause the access control session on the first client device;
handover the access control session from the first client device to the second client device; and
terminate the access control session responsive to the data packets input via the second client device responsive to the input prompt.

10. The system of claim 1, wherein the digital component is provided by a third-party computing device.

11. The system of claim 1, comprising:
the data processing system to instruct a third-party computing device to provide the digital component for execution by the third client device.

12. The system of claim 1, wherein the first client device executes a first surface, the second client device executes a second surface, and the third client device executes a third surface different from the first surface and the second surface, the system comprising:
the data processing system configured to provide the digital component for execution by the third surface and the second surface.

13. The system of claim 1, comprising the data processing system to:
provide, for storage in memory of the third client device, the parameter for the digital component on the digital access control database for the account identifier;
update, responsive to the data packets input via the second client device responsive to the input prompt, the parameter for the digital component stored in the memory of the third client device.

14. The system of claim 1, comprising:
identifying one or more devices within a predetermined distance of the first digital assistant device; and
wherein the second device is selected based upon the identified one or more devices within a predetermined distance of the first digital assistant device.

15. A method of synchronizing access controls between devices to process an operation, comprising:
receiving, by data processing system comprising one or more processors and memory, data packets comprising an input audio signal detected by a sensor of a first client device linked with an account identifier;
parsing, by the data processing system based on a natural language processing technique, the data packets comprising the input audio signal to identify a request for a digital component and one or more keywords corresponding to the request;
establishing, by the data processing system, a session with the first client device and generate, based on a policy for the digital component stored in a digital access control database, an input prompt with a field responsive to the request for the digital component by the first client device linked with the account identifier;

determining, by the data processing system, that the input prompt is incompatible with the first client device;

identifying, by the data processing system responsive to the determination that the input prompt is incompatible with the first client device, a status of a second client device linked with the account identifier that is linked with the first client device;

determining, by the data processing system, that the input prompt is compatible with the second client device based on the status identified by the session transfer component;

performing, by the data processing system, a handover of the session to the second client device and terminate a portion of the session with the first client device;

transmitting, by the data processing system responsive to the handover, the input prompt to the second client device;

receiving, by the data processing system, data packets input via the second client device responsive to the input prompt;

modifying, by the data processing system based on the data packets input via the second client device, a parameter for the digital component stored in the digital access control database for the account identifier;

receiving, by the data processing system, a request to execute the digital component on a third client device linked with the account identifier;

providing, responsive to validation by the access controller component of the parameter for the digital component stored in the digital access control database for the account identifier and a determination by the compatibility checker component that the digital component is compatible with the third client device, the digital component for execution by the third client device.

16. The method of claim 15, comprising:
identifying a plurality of client devices linked with the account identifier;

identifying a subset of the plurality of client devices that are compatible with the digital component; and providing, responsive to modification of the parameter, the digital component for execution on the subset of the plurality of client devices.

17. The method of claim 15, comprising:
receiving a request from the third client device to execute the second digital component;

determining, based on a parameter stored for the second digital component in the access control database, that the third client device is unauthorized to execute the second digital component;

transmitting, to the second client device, an input prompt for the second digital component; and authorizing the third client device responsive to input provided via second client device.

18. The method of claim 15, comprising:
modifying the parameter to provide authorization to execute the digital component by the third client device.

19. The method of claim 15, comprising:
identifying a plurality of fields in the input prompt;

generating audio queries for each of the plurality fields; and receiving one or more input audio signals responsive to the audio queries generated for each of the plurality of fields.

20. The method of claim 15, wherein the session comprises an access control session, the method comprising:
initiating the access control session responsive to the input audio signal detected via the first client device;

pausing the access control session on the first client device;

performing a handover of the access control session from the first client device to the second client device; and terminating the access control session responsive to the data packets input via the second client device responsive to the input prompt.

* * * * *